Figure 4:
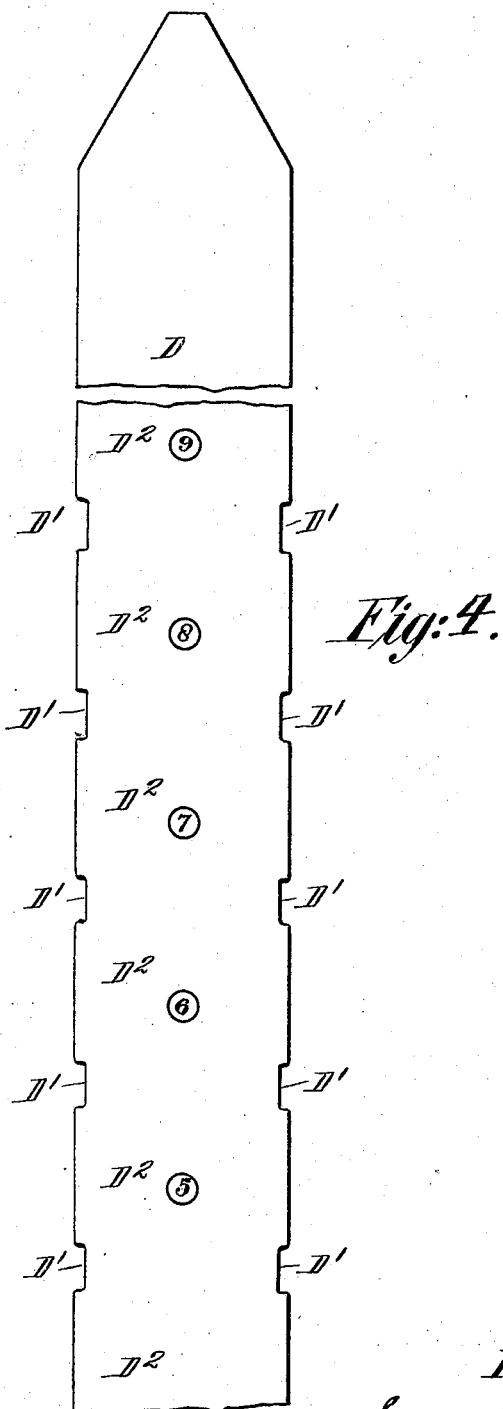

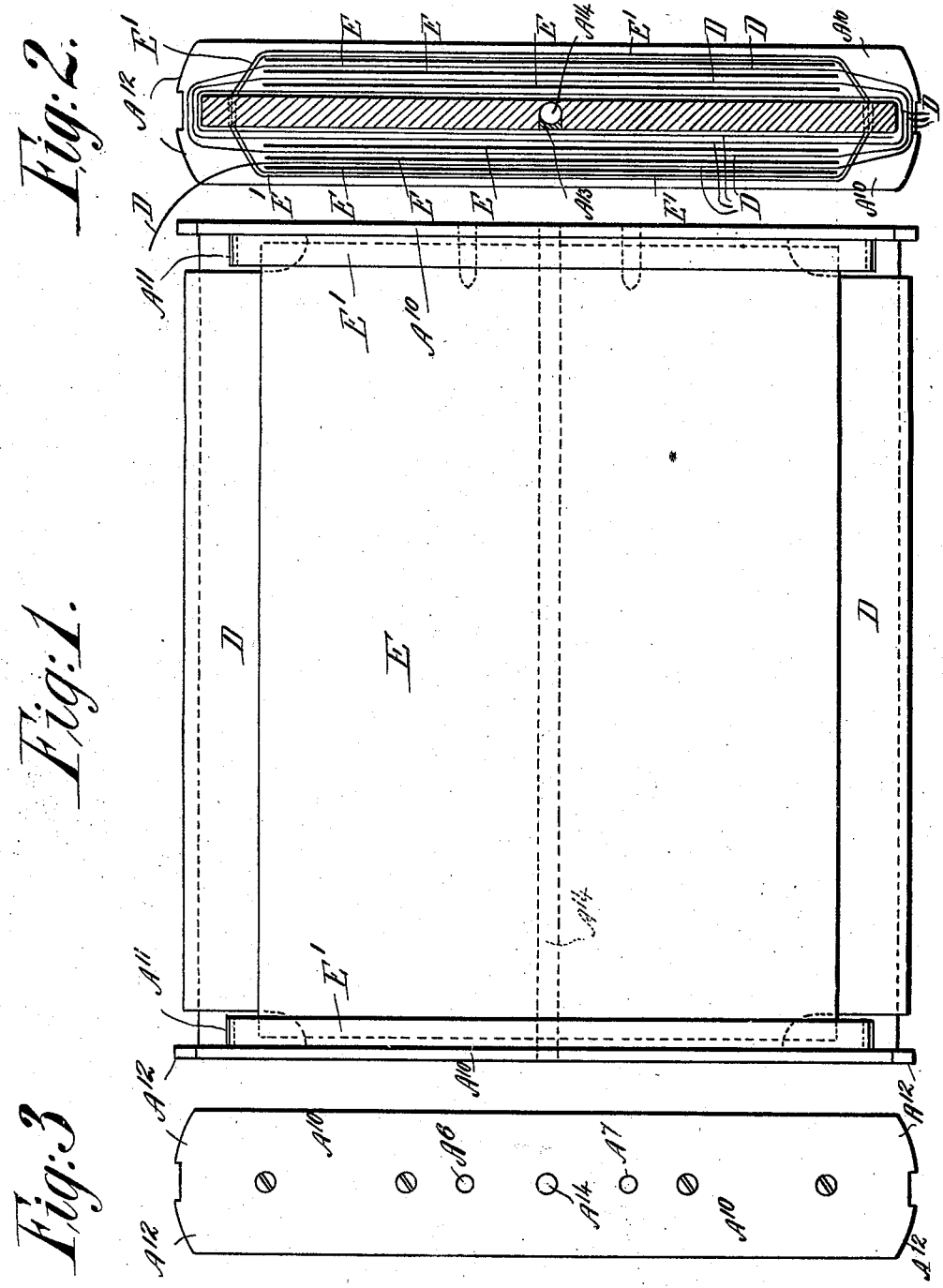

No. 688,579. Patented Dec. 10, 1901.
E. D. BARTLETT.
MAGAZINE FILM HOLDER.
(Application filed Apr. 22, 1901.)
(No Model.) 3 Sheets—Sheet 2.

Witnesses
Inventor
Edwin Drew Bartlett

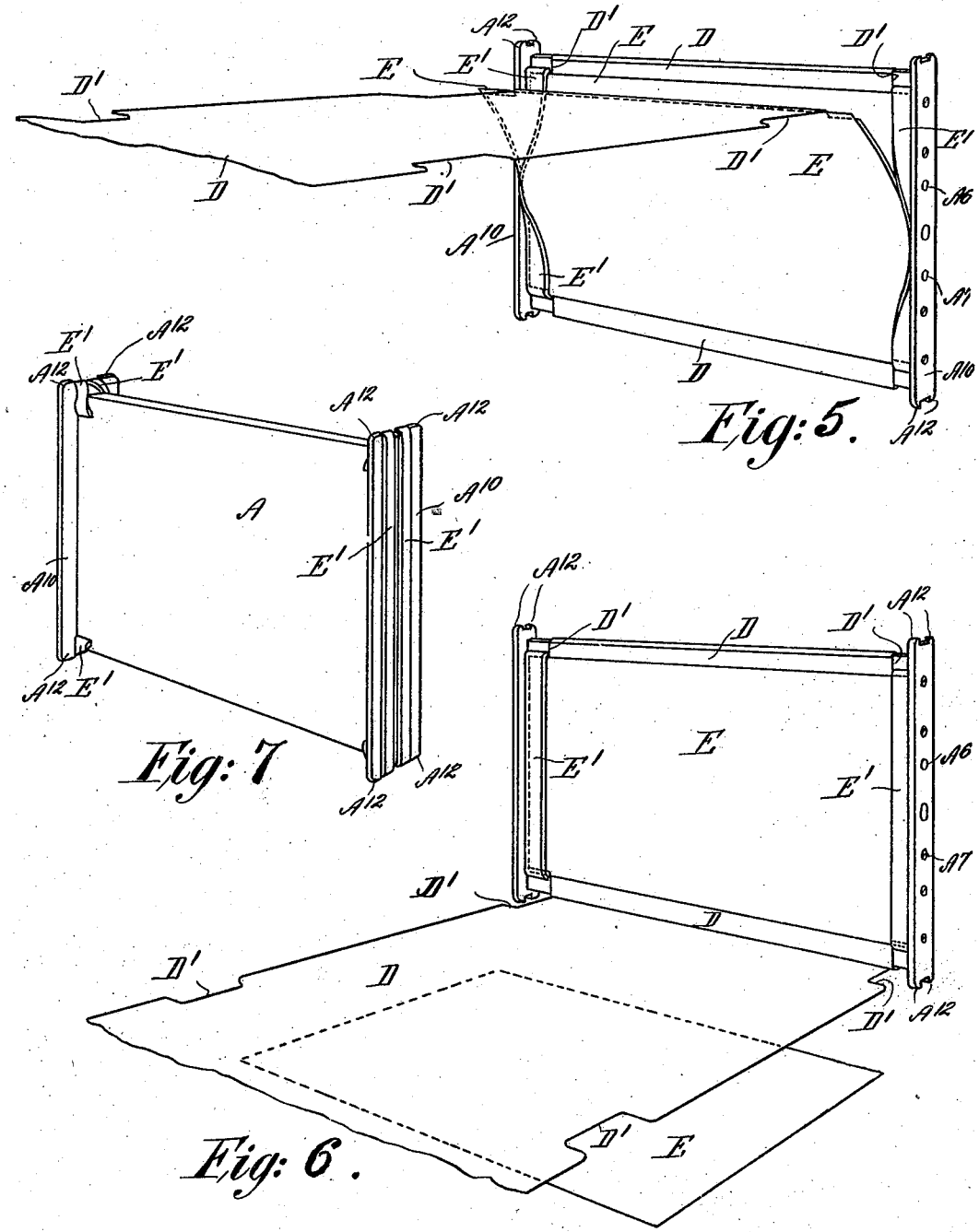

UNITED STATES PATENT OFFICE.

EDWIN DREW BARTLETT, OF SOUTH TOTTENHAM, ENGLAND.

MAGAZINE FILM-HOLDER.

SPECIFICATION forming part of Letters Patent No. 688,579, dated December 10, 1901.

Application filed April 22, 1901. Serial No. 56,963. (No model.)

*To all whom it may concern:*

Be it known that I, EDWIN DREW BARTLETT, a subject of the King of Great Britain, residing at 84 Tynemouth road, South Tottenham, in the county of Middlesex, England, have invented new and useful Improvements in Magazine Film-Holders and the Like, of which the following is a specification.

This invention relates to improvements in film-changing devices for photographic cameras and the like, and is intended to be used with flat or cut films and similar sensitized surfaces.

Attempts have hitherto been made to effect the changing of flat or cut films—*i. e.*, releasing of an exposed film and bringing another film into position for exposure—by employing films with notched edges or opaque backings with notched edges and a mechanism in the camera for alternately engaging and releasing such notched edges, a spring or equivalent being used to continually feed such films and backings forward. The chief drawbacks to these methods are the notching of the films, the cost of the mechanism, and the bulging of the films due to the pressure of the feeding-spring.

This invention has for its object to obviate the said drawbacks, and in carrying it out a flat spool is employed, upon which the films to be exposed when packed are bound or held by means of a long band. When the spool so loaded is placed within the camera and it is desired to change a film, the end of the band is conveniently placed or secured so that it can be pulled from the outside of the camera, is unwound, and thereby effects the release of the exposed film and directs it in its fall into a magazine, as will be hereinafter more fully described. It should be clearly understood, however, that the films are not connected to the band or specially prepared in any way for the purposes of this invention.

In order to enable the invention to be readily understood, reference is made to the accompanying drawings, in which—

Figure 1 is a front elevation of a spool carrying the binding and releasing band and films. Fig. 2 is a central cross-section of the same. Fig. 3 is an end elevation of the spool. Fig. 4 is a plan of a portion of a binding and releasing band. Fig. 5 is a perspective view of the spool, showing the film in the act of being removed. Fig. 6 is a perspective view with film entirely removed. Fig. 7 is a perspective view with bands looped back over horns or projections upon the spool-flanges.

Similar letters of reference indicate similar or corresponding parts throughout the drawings.

The film-holder consists of a flat spool A, provided with end flanges $A^{10}$ and with a central hole $A^{14}$ for mounting it in a camera, preferably by channeling the spool upon one of its faces and closing such channel by a strip $A^{13}$, having a concave under surface. The spool is further provided at one end with recesses $A^6$ $A^7$ for engagement with a suitable turning device in a camera.

The flat spool A is loaded, according to this invention, in one of the following ways: A long strip or band D of opaque material, such as black paper or linen, preferably provided with notches D' along its edges, is wound around the spool, and after any desired number of preliminary windings a film E is placed upon one face of the spool A, between its flanges $A^{10}$, and the band is wound over said film. A second film is then placed upon the opposite side of the spool and the band wound over that, and so on for any number of films with which it may be desired to load the spool. The notches D' in the band D are spaced so as to come always at the top and bottom edges of the spool. The last film having been positioned and the band placed over it, elastic bands or equivalent edge-retaining devices E' may be slipped over the ends of the spool to keep the band from unwinding. In the drawings elastic bands are shown attached to the spool. Slots $A^{11}$ are formed in the side edges of the spool, and the elastic bands are placed in such slots before the flanges $A^{10}$ are applied to the said sides of the spool A. Thus portions of each elastic band will lie in said slots, and portions will lie along the side edges of the spool to retain the edges of the band from unwinding. When the elastic bands E' are attached to the spool A in this manner, horns $A^{12}$ are formed upon the flanges $A^{10}$, and the elastic bands may be looped back over such horns, so as to be clear from the spool when the latter is being loaded, as will be seen by reference to Fig. 7. When the elastic bands are slipped back into place over the edges of the binding and releasing band, they pass into the notches D' in the edges thereof. The elastic bands or edge-retaining devices being applied to the edges aforesaid, the remainder of the binding and releasing band is wound around the spool and serves to exclude any rays of light from reaching the sensitized surfaces of the films.

If desired, the band or strip D might be provided upon each alternate space $D^2$ with a dummy film. This enables a spool to be loaded upon one side only. The end of the band being attached to the spool, a film is placed upon one face of the latter, and the band or strip D is folded up over it. The band is then folded down again from the top, bringing a dummy film attached to a space $D^2$ over the face of the spool. A second film is then placed upon the spool at the back of the space $D^2$ and the band again folded up and down. Thus a number of zigzags are produced having real and dummy films alternately placed between its folds. The edges of the band are secured by one of the before-mentioned devices.

From the foregoing it will be seen that if the binding band or strip D' be pulled in the required direction, as shown in Fig. 5, it will release its edges and the edges of the film outside itself free from the edge-retaining devices and the film may be allowed to fall, as shown in Fig. 6, into a convenient receptacle, while the band may be operated and disposed of in any convenient manner.

When the spool loaded upon both sides has been mounted in a camera, the band D is unwound to uncover a film and the latter is exposed. The spool may now be turned so as to bring the film upon the opposite side of the spool in front of the lens, thereby turning the exposed film toward the back of the camera. The exposed film may now be released by pulling the band in the manner above described. This operation is repeated for all the films upon the spool. When employing a spool loaded upon one side only in the zigzag manner, the spool need not be turned, it being only necessary to unwind or disengage from the edge-retainers a portion of the band, with its attached dummy films, until the exposed film has been released and a fresh film uncovered. If desired, of course this spool might be turned each time toward the back of the camera for the releasing operation and then turned back again when it is desired to expose a fresh film.

As the outside films will be nearer to the lens of the camera than those lying near to the spool A, provision may be made in the camera for securing for all the films the same focus.

In order to allow of portion of the charge of films to be removed in daylight after, say, six films have been bound on the spool A, two or three complete turns of the opaque binding or releasing band are made without placing any films upon the spool, after which six other films may be bound onto the spool. It will be readily understood that after the sixth film has been exposed and released the remaining six upon the spool will be entirely covered by the band, so that the camera may be opened for the removal of the exposed films without fear of any light reaching those upon the spool. The lid of the magazine may now be closed, the back of the camera removed, and the magazine withdrawn in daylight without fear of spoiling a film by unintentional exposure.

It is to be further understood that this invention is not confined to the employment of elastic bands for edge-retaining devices, but includes the employment of other flexible or elastic retaining devices which would act in similar fashion.

What I claim as my invention, and desire to secure by Letters Patent, is—

1. A film-holder consisting of a film-carrying spool; a band upon said spool between the superposed layers of which the unattached films are held, and means for temporarily securing the said band and films at their edges to said spool.

2. A film-holder consisting of a film-carrying spool; a band upon said spool between the superposed layers of which the unattached films are held, and devices movable under the pull of said band to temporarily secure the said band and films at their edges to said spool.

3. A film-holder consisting of a film-carrying spool; a band upon said spool between the superposed layers of which the unattached films are held, and yielding retaining devices to temporarily secure the said band and films at their edges to said spool.

4. A film-holder consisting of a film-carrying spool; a band upon said spool between the superposed layers of which the unattached films are held, and elastic retaining-straps to temporarily secure the said band and films at their edges to said spool.

5. A film-holder consisting of a flat film-carrying spool and a band upon the spool alternating with unattached films and operating to release them successively as it is unwound, substantially as set forth.

6. A film-holder consisting of a flat film-carrying spool, a band around the spool alternating with unattached films and operating to release them successively as it is unwound, and yielding edge-retaining devices upon the ends of the spool, substantially as set forth.

7. A film-holder consisting of a flat film-carrying spool, a band around the spool alternating with unattached films and operating to release them successively as it is unwound, and elastic bands upon the ends of the spool, substantially as set forth.

8. A film-holder consisting of a flat film-carrying spool, a band upon the spool alternating with films, yielding edge-retaining devices upon the ends of the spool, and projections upon the flanges of the spool, substantially as set forth.

9. A film-holder consisting of a flat film-carrying spool provided with recesses in its ends, a notched band upon the spool alternating with films, elastic bands lying partly within the said recesses, and horns upon the flanges of the spool, substantially as set forth.

10. A film-holder consisting of a flat film-carrying spool provided with recesses in its ends, a notched band upon the spool alternating with films, and elastic bands lying partly within the said recesses.

In testimony whereof I have signed my name to this specification in the presence of two subscribing witnesses.

EDWIN DREW BARTLETT.

Witnesses:
R. J. TUGWOOD,
A. E. L. POOLE.